United States Patent [19]

Walsh

[11] Patent Number: 4,677,282
[45] Date of Patent: Jun. 30, 1987

[54] FAILURE PROTECTION IN TEMPERATURE CONTROL

[75] Inventor: William J. Walsh, Dubuque, Iowa

[73] Assignee: Thermolyne Holdings Inc., Dubuque, Iowa

[21] Appl. No.: 833,284

[22] Filed: Feb. 27, 1986

[51] Int. Cl.⁴ .............................................. H05B 1/02
[52] U.S. Cl. .................................... 219/508; 219/494; 219/497; 340/640
[58] Field of Search .............. 219/212, 501, 505, 494, 219/497, 491, 507, 508, 509; 320/235, 236, 319, 246; 340/640, 384 R, 584

[56] References Cited

U.S. PATENT DOCUMENTS

| | | | |
|---|---|---|---|
| 3,944,893 | 3/1976 | Hayden | 219/492 |
| 4,109,134 | 8/1978 | Van Herten | 219/497 |
| 4,393,300 | 7/1983 | Proctor | 219/506 |
| 4,421,976 | 12/1983 | Jurek | 219/497 |
| 4,485,296 | 11/1984 | Ueda et al. | 219/497 |

Primary Examiner—M. H. Paschall
Attorney, Agent, or Firm—Marjama & Pincelli

[57] ABSTRACT

A triac and a mechanical relay, in series with the electrical heater of an incubator, together switch heater current on and off at the same set point temperature if the triac fails short. Similarly, a second mechanical relay in parallel with the triac switches heater current around the triac, should the triac fail open.

12 Claims, 3 Drawing Figures

4,677,282

FAILURE PROTECTION IN TEMPERATURE CONTROL

FIELD OF THE INVENTION

The field of the invention is the electrical heating of instrumentalities such as incubators, wherein are occurring biochemical process, such as enzyme reactions. In such an instrumentality, the temperature is being controlled such as to suit the process occurring therein.

PRIOR ART BACKGROUND

My U.S. Pat. No. 4,504,733 discloses and claims a closed loop temperature control method and system now in use in incubator control. The control system described in the patent does not include protection against failure of the element (thyristor 30) directly controlling the flow of electrical heating current. If the thyristor fails by becoming a short triac branch of the circuit, the result may be catastrophic, because only a relatively slight rise in temperature can spoil the reaction in the incubator.

Many closed loop temperature control systems guard against catastrophic temperature runaway by utilizing a second temperature control system which is set at a slightly higher temperature than the first and which "takes over" if the temperature exceeds that for which the first system is set and equals that for which the second system is set.

The degree of protection is largely dependent upon which functions of the first system are duplicated in the second system. Generally, the protection is highest when all functions are duplicated. For the sake of example, a common temperature sensor could feed two control systems. This would give essentially complete protection except in the event the sensor failed. Separate sensors would avoid this problem.

The duplication of the various system functions is often termed redundancy and the degree of protection offered is therefore largely dependent upon the degree of redundancy.

Complete redundancy essentially doubles the cost of the overall control system. For many applications, this degree of protection is neither economically feasible nor necessary, considering the very low failure rate of components operating at lower voltages (e.g., 12 volts DC).

Therefore, in a control system using electrical heating, failure is largely confined to the switching components operating at supply line voltages. Failure is particularly common in such components as triacs, silicon controlled rectifiers, and some components, such as optocouplers, used for triggering these devices.

Failure is generally of two types; permanent failure as a result of the thyristor shorting from a voltage or current surge, such as might be caused from voltage induced in a power line by a nearby lightning stroke; temporary malfunction from repeated voltage spikes on the power line causing continual firing of thyristors through the dv/dt effect. This temporary malfunction disappears when the repeated spikes cease.

A disadvantage of an overall control system where a second control system is set to control at slightly higher temperature than the first is, that in the event of failure of the first system, the temperature will rise to the point where the second system will control it. In some instances, even a small temperature rise may be detrimental. This may be true, for example, in the case of enzyme reactions.

Another possible disadvantage of some redundant systems is that, where the heating current switching device in the redundant system is of the same nature (e.g., thyristor) as that of the primary system, the same voltage surge, voltage spikes, or any other phenomenon detrimental to one could cause simultaneous failure of the other system.

It is, therefore, an object of this invention to provide relatively low-cost redundant means to protect a thermal system from temperature runaway in the event of failure or malfunction of an output device.

An additional object of this invention is to provide such protection without appreciable rise in the controlled temperature.

Another object of this invention is to provide power switch or power cutoff means of a different nature than those means in the primary system. This will normally be a relay or a circuit breaker with an auxiliary trip coil or the like. In this way, the long switching life of the thyristor is combined with the high transient overload and interference - rejection capabilities of a relay or circuit breaker.

SUMMARY OF THE INVENTION

Briefly, this invention provides a control system which will switch an electrical circuit indefinitely in its normal mode of operation, but in the event of failure of an output switching thyristor or the like, will transfer operation to a second output switching system which controls at essentially the same temperature, but which has reliability characteristics complementary to thyristors (as in the case of relays and circuit breakers).

In particular, in the output circuit of the controller of my above-cited patent, I insert relay contacts in series with the thyristor and provide logical circuitry which senses the drive and conditions of the thyristor. When there is a demand for heating current, the logical circuitry assures that the relay goes to the closed state. If the thyristor has short-circuited, the logical circuitry nevertheless assures that, when the demand ceases, the relay contacts go to the open condition, thereby cutting off the flow of heating current despite the short-circuited thyristor.

Figure 1:
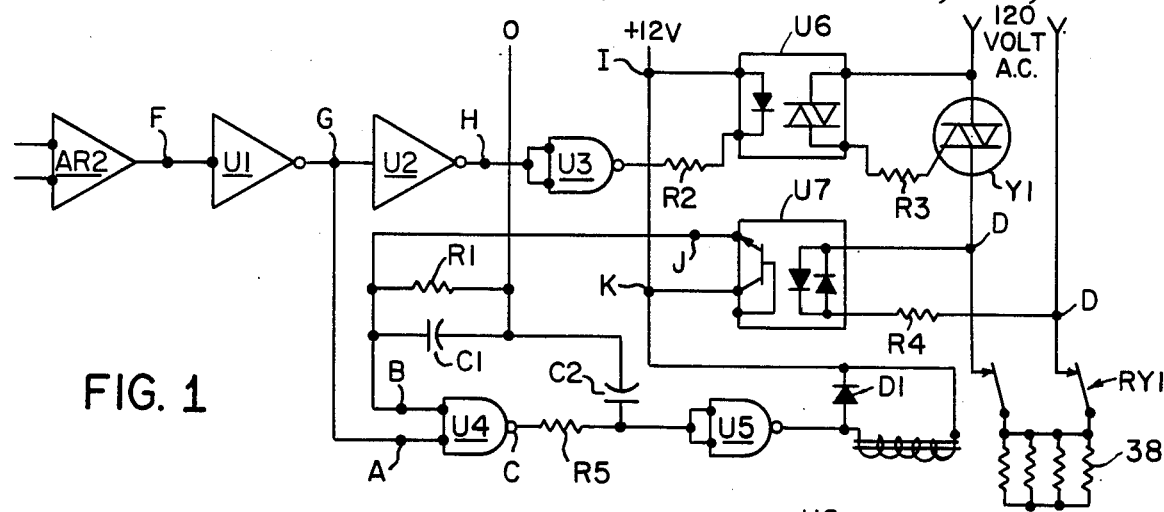
FIG. 1 shows the output circuitry of the controller of my aforesaid patent modified to include failure protection in accordance with my invention.

The illustrative circuit diagram of FIG. 1 mainly omits showing the functional parts of the patent's controller circuit incorporating the present invention. Point F is the point of the circuit ordinarily used to drive the output device, Y1, such as a triac. For purposes of illustration, point F is here shown as the output of a comparator, AR2, but, for example could be the output of a time-proportioning circuit, or the like.

Failure protection circuitry is provided by U1 and U2, which are logic inverters (each may be one-fourth of a CD4011 or, preferably, a CD4093); U3, which is a logic gate capable of sinking an appreciable current (such as one-half of a CD40107); U4, which is a NAND gate, and is preferably, but not necessarily, of the Schmitt trigger type (such as one-fourth of a CD4011); U5, which is similar to U3 and can be the other half of U3; U6, which is an optocoupler (such as MOC3022) which couples the drive signal from U3 to triac Y1, while providing electrical isolation; RY1, which is a relay activated by U5; and U7, which is another optocoupler (such as H11AA2) which detects the voltage output status of Y1 and provides a logic signal to U4 dependent upon this status.

In addition, a capacitor C1 is provided for filtering the output of optocoupler U7, while a resistor R1 discharges C1 when U7's logic output is zero. Current limiting is provided by resistors $R_2$, $R_3$, and $R_4$. A capacitor C2 and resistor R5 provide a time constant as will be explained later, while a diode D1 shunts the back EMF of the relay to prevent it from breaking down the output section of U5. The time constant $R_1 C_1$ should be short and in some cases $C_1$ should be omitted. If too long, this time constant may make it appear that there is momentarily output from the triac even in the absence of gate drive.

As indicated in FIG. 1, +12 volts D.C. is applied to U6 and U7 at points I and K, and zero volts, i.e., the other side of the 12 volt source (not shown, but which will also supply the rest of the controller circuitry), is applied to the common junctions of $R_1 C_1$, and $C_2$.

The above-described circuitry has two main functions, one, normal operation, being simply to turn the heater 38 on and off, as commanded by comparator AR2. The other function, abnormal operation, acts as a failure protection circuit activated by NAND gate U4, if and only if both inputs to U4 are high. It needs to be noted that one skilled in the art will know of or be able to readily devise logically equivalent circuits which will effect the same results, but with different arrays of logical elements.

Normal operation is as follows:

In normal operation, when a sensor (not shown, but corresponding to thermistor 6 of FIG. 4 of my above-identified patent) tells the controller that the temperature of the instrumentality (not shown) being heated by resistors 38 is too low, the controller causes comparator AR2 to produce a high output signal at F (other wise, point F will be low, i.e., the temperatures of the instrumentality will be close enough to the desired value that it needs no heat.)

When the output F of the comparator is high, points G and A are low and point H is high. The triac fires, supplying voltage to point D. This in turn causes points J and B, the output of U7, to be high. Inasmuch as point A is low and point B is high, point C will be high and the relay will close, activating the heaters.

When the output of the comparator is low, points G and A will be high, and point H, low. The triac will not fire so there will be no voltage at D. Therefore, points J and B will be low. So, with point A high and point B low, point C will be high and the relay will remain closed, but no power will be supplied to the heaters because the triac is not conducting.

Abnormal operation is as follows:

Suppose point F is low, points G and A are high, and point H is low. Ordinarily the triac will not conduct under these conditions. Suppose, however, that a voltage surge has shorted the triac between its main terminals, or that line interference turns the triac on due to its dv/dt effect.

In this case, point D will be supplied with voltage and points J and B will be high. Now note that both points A and B are high, so that C will go low and the relay will drop out, removing power from the heaters.

When, however, point F again becomes high, the relay will pull in because the circuit cannot distinguish between a triac that conducts because it is shorted and one that conducts because it has been triggered by drive voltage on its gate.

It will now be seen that the relay will now take over the function of making and breaking the circuit to the heaters, so despite triac failure, the circuit will still control temperature in an essentially normal manner and at the set point temperature.

Now let us go back to normal operation. As the triac turns off, there may be a very brief period of time when both inputs to U4 are positive because of (a) time delay effected by C1 and (b) continuation of conduction by the triac after gate drive is removed. Momentary dv/dt transients may also effect this condition. Unless otherwise prevented, this will cause a momentary drop-out of the relay, creating unnecessary relay wear and noise.

Therefore, I have incorporated a time constant in the circuit following point C. This constant has to be sufficiently long to prevent the input of U5 from making the transition from a 1 to a 0 during ordinary transient periods, but short enough to permit this transition to take place if the condition persists. I have found that for my application, a time constant of 1 to 3 seconds is satisfactory. For other applications, a shorter or longer constant may be desirable. This time constant is effected by resistor R5 and capacitor C2.

It may be noted that a second failure condition resulting, for example, from a triac which has failed open instead of shorted, will give a low signal at both points A and B. In many or most cases, this condition, which results in a falling temperature of the instrumentality being heated, does not result in catastrophic consequences and can therefore be tolerated.

Figure 2:
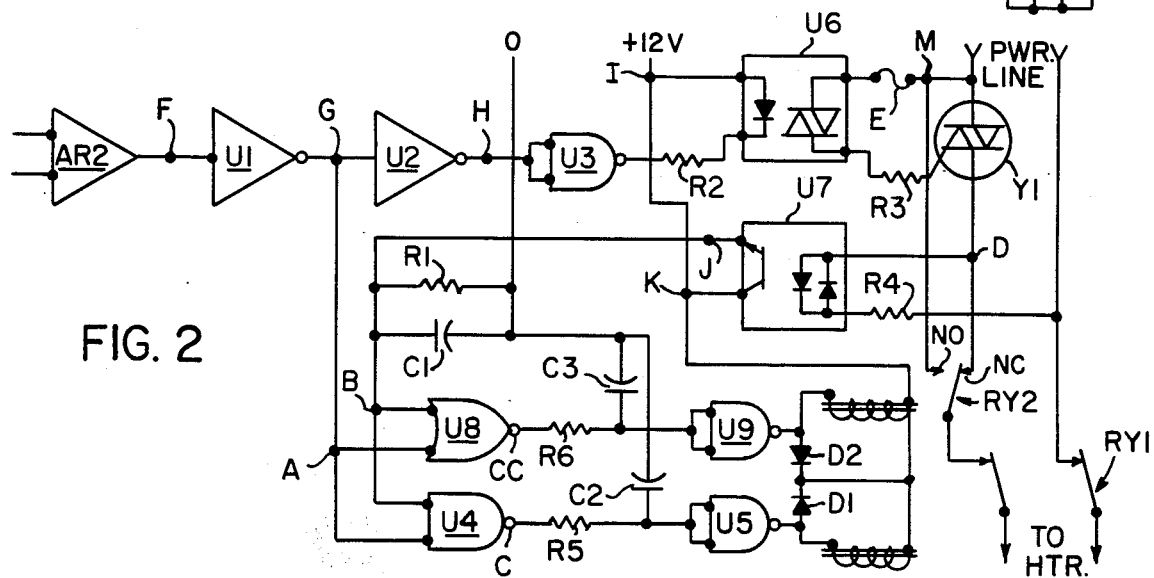
FIG. 2 shows a modification according to the invention for the circuitry of FIG. 1.

However, as shown in FIG. 2, this condition may be protected against by having points A and B of FIG. 1 provide the inputs to a NOR gate U8, wherein the output of this gate, filtered by $C_3$ and $R_6$, operates a relay driving chip U9, such as one-half of a CD40107; which, in turn operates a relay RY2, which, in essence, shunts the triac's main terminals. In this circuit, the logic signal fed back is a function of the conductive condition of the triac only, and the fuse E must be provided to keep U6 from trying to carry the line current when the triac is open.

Again, a diode D2, like D1, shunts the back emf of RY2 and the time constant $R_6C_3$ is used to ignore transient conditions. Point D continues to be the input to the voltage sensing optocoupler U7.

Normally, the relay RY2 has a normally-closed contact NC, which connects point D to the corresponding, also-closed contact of RY1, and this condition of RY2 does not change provided that the triac is conducting (whether due to triggering or short-circuiting). However, if the triac open-circuits between its main terminals while G is low (i.e., the controller is calling for heat), J will be low as there is no input to U7 from points D, and A and B will be low, so CC, the output of NOR gate U8 will be high, thereby causing U9 to drive the relay RY2 to shunt the triac via its now-closed contact NO, which is connected point M thus putting closed contacts of the relay in parallel with the circuit branch containing the triac, while at the same time opening the contact NC, which is in series with the triac, as indicated in FIG. 2. Because there is no circumstance of operation wherein both A and B are low at the same time, except when heat is called for, and the triac is non-conducting, i.e., no voltage at D to drive U7, the presence, of U7, U8, U9, and RY2 will not influence normal and abnormal operations described in connection with FIG. 1.

The FIG. 2 circuit retains the logic of the FIG. 1 circuit and so is enabled to detect either type of failure and circumvent it. The FIG. 1 logic could be omitted, in which case, the contacts of the relay RY1 would be replaced in the circuit by electrical continuity at the points it makes and breaks the connections to the heater in FIG. 1.

Figure 3:
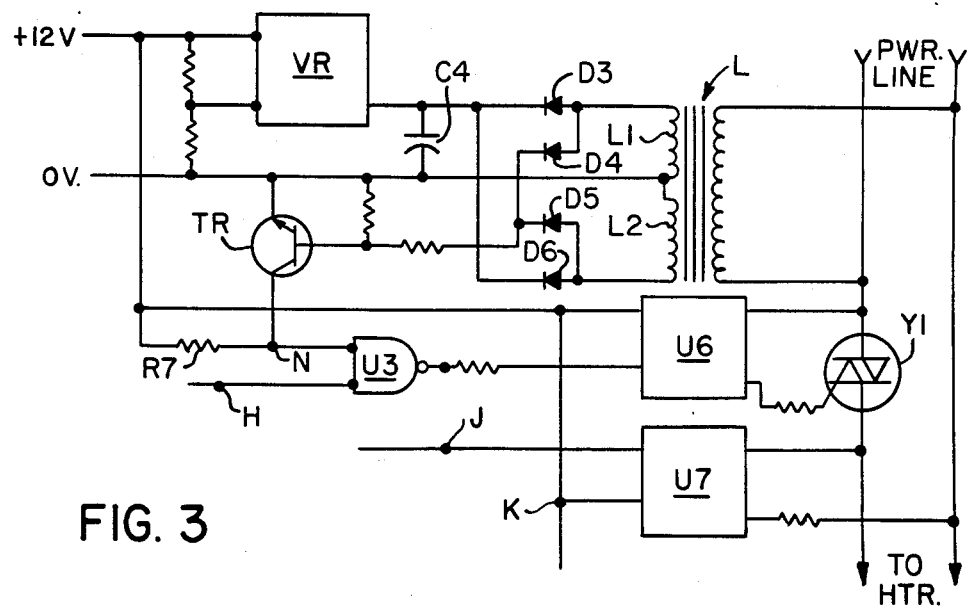
FIG. 3 shows a modification of FIG. 1 according to the invention.

It may also be noted that either of these failure detecting logics, or their use in combination, may easily be made zero voltage switching by disconnecting from each other the two inputs at U3 and providing one input with a pulse during zero crossover of the line current. The other input would remain connected to the output of U2. Such a pulse may be derived by clipping and inverting a full-wave rectified signal from the heater power source. Thus, in FIG. 3, a transformer L has its primary winding connected to the 120 volt A.C. supply for the heater resistors 38. Its secondary winding is split into the 12 volt halves L1 and L2. These winding halves together with diodes D3 and D6 and capacitor C4 supply a full wave rectified and filtered voltage to voltage regular VR (such as LM317). Winding halves L1 and L2 together with diodes D4 and D5 supply a full wave rectified and unfiltered voltage to the base of TR (such as 2N2924), which, in the connection shown, is fully saturated except near zero volts across windings L1 and L2. The gate U3, instead of having its input terminals strapped as in FIG. 1, in FIG. 3 has one of them connected to N, the junction of a resistor R7 (100 kohm) and the collector of transistor TR, which junction is connected via R7 to +12 volts D.C., instead of to its other input terminal. Such other terminal remains connected to the output of U2.

In operation, as before, U3 makes optocoupler U6 trigger the thyristor Y1 only when both of its inputs are high. Since, in addition, the saturation of transistor 27 at all times prevents its collector from going high, then only when the AC voltage crosses zero, and the controller is calling for heat, can both input terminals of U3 be high.

Finally, it might be noted that U1, U2, and U4 may be either three sections of a quad NAND gate or 3 sections of a CD4093, i.e., a NAND gate having hysteresis giving at the properties of a Schmitt trigger.

The circuit can be made to hold temperature under output device failure conditions with the circuit as shown. It may be made to shut down by substituting an auxiliary tripped circuit breaker for the relay or by interspersing an R-S flip flop between U4 and U5.

Redundancy in the circuit of FIG. 1 is at the minimum, and in a sense nil due to the fact that relay RY1 remains closed in normal operation. Despite being continually in use, therefore, normal operation does not cause wear and tear of the mechanical parts of the relay.

Again, ordinary redundancy can degrade performance, simply because the redundant system generally has to be set to act at a higher temperature than its fellow. This can put a limit of as much as several ° C. on the ability to hold the controlled temperature at the desired value or set point. In my invention, however, the point for abnormal operation is substantially the same as for normal operation, so performance is not degraded.

Finally, the circuit of FIG. 1 contains much inherent failue protection. For instance, faults in the chain U2, U3, $R_2$ and U6 may about as likely result in failure to trigger Y1 as in unwated triggering, and short circuit of the optocoupler U6 causing unwanted triggering of Y1 will, if the logical circuitry is otherwise functioning properly, be treated the same as if the triac is shorted.

I claim:

1. In electrically heating an instrumentality to, and maintaining it at, a predetermined temperature, the combination of,
   (a) control means for producing high signal or alternately low signal, depending on whether the temperature of said instrumentality is respectively less or not less than said predetermined temperature;
   (b) heating means for heating said instrumentality in response to electrical current being applied to said heating means;
   (c) first switch means for connecting and disconnecting itself to a source of said current in response to said high or low signal, respectively, from said control means;
   (d) second switch means for connecting and disconnecting itself to said first switch means, also in reponse to said high or low signal, respectively, from said control means, said heating means and said first and second switch means being constructed and arranged such that said current is applied via said first and second switch means in series to said heating means only when both said first switch means is connecting itself to said source and said second switch means is connecting itself to said first switch means, whereas any said switch means disconneting itself prevents application of said current to said heating means,
   (e) failure protection means responsive to simultaneous production of said low signal and connection of said first switch means to said source for preventing said second switch means from connecting itself to said first switch means should failure of said first switch means cause said first switch means to connect itself to said source while said control means is producing said low signal; and
   (f) said second switch means remaining responsive to said high signal to connect itself to said first switch means even when said failure has occurred, whereby should said first switch means connect itself to said source because of failure of said first switch means, only production of said high signal will result in application of said current to said heating means.

2. The invention of claim 1 wherein said first switch means is triac means and said second switch means is mechanical relay means;
   said failure protection means comprising
   (a) triggering means connected to said control means for causing said traic means to conduct said current in response to high signal from said control means,
   (b) first logic means connected to said control means and responsive to said high signal to provide low signal,
   (c) second logic means connected to said triac means for producing high signal in response to conduction of said current by said traic means, and
   (d) third logic means connected to said first and second logic means and to said mechanical relay means for causing said relay means to connect said heating means to said first switch means when said first and second logic means are providing signals which are not both high, and to disconnect said heating means from said first switch means when said first and second logic means are producing signals both of which are high.

3. In a temperature control system having heating means responsive to energy applied thereto for converting said energy to heat, and a temperature controller for causing said energy to be applied to said heating means in accordance with deviation of an acutal temperature from a predetermined set point, which temperature increases in response to said heat;

said controller comprising a plurality of control means for connecting said heating means to a source of said energy, and wherein each of said control means can be caused to assume and maintain either a first state wherein it conducts said energy or a second state wherein it will not conduct said energy, said plurality being arranged such that if each said control means of said plurality simultaneously maintains said first state, said energy will simultaneously be applied to said heating means, and said plurality being arranged such that if one control means of said plurality assumes said second state, no said energy will be applied to said heating means while the said one control means maintains said second state;

said controller being responsive to said deviation to cause said one control means of said plurality to assume and maintain said first or second state depending on whether or not said temperature is respectively below or at said set point;

said one control means being subject to being in a failure mode in which it is in said first state and said controller cannot cause it to assume said second state, and there being protective means actuatable by said controller for protecting said control system against such failure of said one control means, said protective means including a second control means of said plurality and; said controller having logic means connected to said plurality of control means for sensing both when said one control means is in said failure mode and whether or not said temperature is at said set point, and being connected to said protective means for acutating said second control means to said second state as a result of both said one control means being in said failure mode and whether or not said temperature being at said set point, but allowing said second control means to be actuated to said first state whenever said temperature is below said set point, even when said one control means is in said failure mode.

4. The invention of claim 3, wherein a third control means of said plurality is provided both between said one control means and said second control means, and as well between the source of said energy and said second control means;

said third control means being actuable to assume and maintain either said first state or said second state with respect to said one control means, or, alternately and respectively to assume and maintain said first state or said second state with respect to said source; said one control means being subject to a second failure mode in which it is in said second state and cannot be caused by said controller to assume said first state;

said logic means being connected to said plurality of control means for sensing when said one control means is in said second failure mode, and being connected to said third control means for actuating said third control means to assume and maintain both said second state with respect to said one control means, and, simultaneously, said first state with respect to said source.

5. In a temperature control system having heating means and wherein heating current is controlled both by conduction of said current between main terminals of a thyristor triggerable, from a non-conducting state between said terminals to a conducting state therebetween by first trigger means connected to said thyristor, and by conduction of said current between closed contacts of a relay triggerable from an open state into a closed state by second trigger means connected to said relay, and wherein controller means is provided for producing first signal having a first sense signifying that current should be conducted both between said terminals and said closed contacts, and alternatively for producing instead a second signal having a second sense logically opposite to said first sense, the improvement comprising logical circuit means responsive to abnormal operation for distinguishing between normal operation wherein that one of said states existing between said main terminals is that state called for by the sense of that one of said signals being then provided by aid controller means, and abnormal operation wherein that one of said states existing between said main terminals is not that one called for by the sense of said signals being then provided by said controller means;

there being control means which both includes said relay and is operated by said logical circuit means for restoring normal operation as aforesaid in response to said logical circuit means responding to occurrence of abnormal operation as aforesaid.

6. The invention of claim 5, wherein said logical circuit means is connected to said thyristor for sensing when said thyristor is in said conducting state, to said controller means for sensing when said controller means is producing said first signal having a sense calling for said conductive state, and to said triggering means for triggering said relay into the closed state when said conducting state and a said first signal calling for same both exist.

7. The invention of claim 5 wherein said logical circuit means is connected to said thyristor for sensing when said thyristor is in said non-conducting state, there being a shunt interconnecting said main terminals and said relay having normally-open contacts in said shunt and normally-closed contacts connecting one of said main terminals to said heater; said logical circuit means being connected to said controller means for sensing when said controller is producing a signal calling for said conductive state, and also being connected to said relay for actuating said relay such that its normally-closed contacts open, and its normally-open contacts close, when said non-conductive state and a said first signal calling for said conductive state both exist.

8. The invention of claim 5, wherein said logical circuit means is connected to said thyristor for sensing when said thyristor is in said conducting state, to said controller means for sensing when said controller means is producing said first signal having a sense calling for said conductive state, and to said triggering means for triggering said relay into the closed state when said conducting state and a said first signal calling for same both exist, said closed contacts connecting current from said thyristor in conducting state to said heater; said logical circuit means also sensing when said thyristor is in said non-conducting state, there being a shunt interconnecting said main terminals and said switch means including a second relay having normally-open contacts in said shunt and normally-closed contacts connecting one of said main terminals to said heater; said logical circuit means being connected to said controller means for sensing when said controller is producing a signal calling for said conductive state, and also being connected to said second relay for actuating said second relay such that its normally-closed contacts open, and its normally-open contacts close, when said non-conductive state and a said first signal calling for said conductive state both exist.

9. A circuit in combination with first switch means, said first swtich means being switchable between a closed state and an open state, one said state being subject to failue such that said first switch means cannot be switched out of said one said state to the other said state;

said circuit incorporating said first switch means in a branch thereof for controlling flow of current in said branch in accordance with the then-obtaining state of said first switch means, said circuit also including means providing a switching signal in response to said failure;

said circuit also incorporating failure prevention means in said branch, said failure protection means having second switch means switchable out of said one said state in response to said switching signal for controlling said flow of current in said other said state.

10. The invention of claim 9, wherein said second switch means has a pair of contacts, said contacts being in said branch and in series with said first switch means;

said circuit having control means for switching said first said means between said states and, simultaneously, opening or closing said contacts depending on whether said first switch means is being switched to said open state, or to said closed state respectively.

11. The invention of claim 9, wherein said second switch means has two pairs of contacts in said branch, one said pair being in series with said first switch means, and the other said pair being in parallel with said first switch means, said circuit having control means for switching said first said switch means between said states and, simultaneously, opening or closing the serial said pair of contacts depending on whether said first switch means is being switched to said open sate, or to said closed state, respectively;

both said states of said second switch means being subject to failure, and said control means providing a switching signal also providing a further switching signal in response to failure of the said other said state.

12. The invention of claim 9, wherein said second switch means has a pair of contacts, contacts being in parallel with said first switch means;

said circuit having control means for switching said first said means between said states and, simultaneously, opening or closing said contacts depending on whether said first switch means is being switched to said closed state, or to said open state, respectively.

* * * * *